Aug. 7, 1928.
W. A. CICERO
1,679,814
COMBINED CANT HOOK AND AX
Filed June 4, 1927
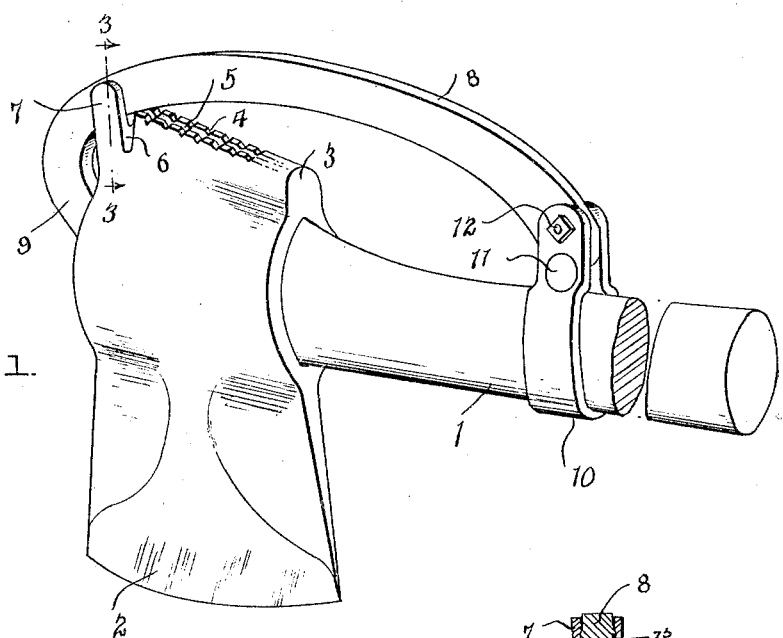
Fig. 1.
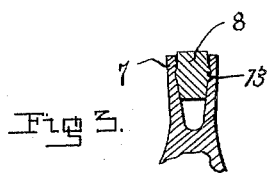
Fig. 2.       Fig. 3.
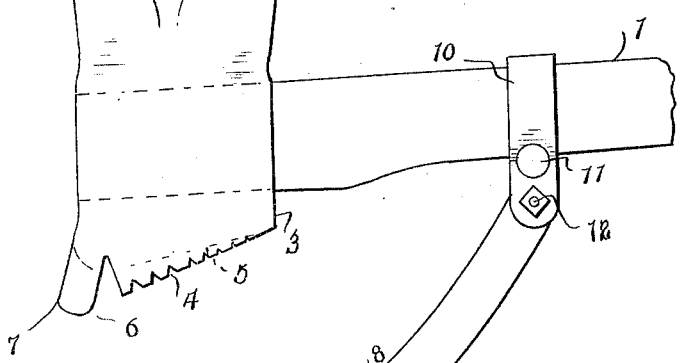
Inventor
W.A. Cicero
By Lacey & Lacey, Attorneys Patented Aug. 7, 1928.

1,679,814

UNITED STATES PATENT OFFICE.

WILLIAM A. CICERO, OF BIRCHDALE, MINNESOTA.

COMBINED CANT HOOK AND AX.

Application filed June 4, 1927. Serial No. 196,545.

This invention provides an implement which may be used for felling trees, stripping the same of branches and bark, and rolling the trunks over as required in the handling of the work.

The invention provides an implement of the nature aforesaid in which the ax helve also serves as a lever for the hook and in which the hook provides a guard and retainer for the blade, the latter in turn coacting as a jaw to supplement and facilitate the operation of the hook.

While the drawing illustrates a preferred embodiment of the invention it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawing hereto attached, in which,—

Fig. 1 is a perspective view of an implement embodying the invention, a portion of the handle being broken away;

Fig. 2 is a side view of the implement adapted for use as a cant-hook; and

Fig. 3 is an enlarged fragmentary sectional view on the line 3—3 of Fig. 1.

Corresponding and like parts are referred to in the following description and designated in the views of the drawing by like reference characters.

The numeral 1 designates the helve of an ax which, in accordance with the invention, serves both as a handle for the cutting tool and a lever for the cant-hook. The head or poll of the ax comprises the usual blade 2 and back 3 and is formed with an eye or opening in which is fitted the helve 1. In accordance with the present invention the back of the ax head slopes rearwardly and is toothed, as indicated at 4, to make positive engagement with the trunk of a tree, or with a pole or log, to prevent slipping when the implement is used as a cant-hook for turning the part over. A longitudinal groove or channel 5 is formed in the back of the ax head and decreases in depth towards the inner or rear edge of the head, thereby separating the toothed portion of the back to provide two rows of teeth upon opposite sides of the plane of the cant-hook. A forward portion of the back is separated therefrom by means of a V-shaped cut 6 to provide a clip 7 which is forked to embrace opposite sides of the cant-hook, as indicated most clearly in Fig. 1, and thereby prevent lateral movement of the hook at its free end.

The hook comprises a shank 8 and a bill 9, the shank 8 being curved throughout its length and pivoted to a clamp 10 mounted upon the helve 1. The clamp 10 is formed of a metal strap bent to encircle the helve 1 and clamped thereto by means of a bolt 11, the end portions of the strap extending to receive the shank 8 which is pivotally mounted upon a bolt 12 connecting the extended ends of the strap, and supplementing the action of the bolt 11. The clamp 10 is adjusted upon the helve so that when the hook is adjusted to the position substantially as shown in Fig. 1, the outer end of the shank 8 is engaged with the clip 7 and the point of the bill 9 engages over the outer edge of the ax head and obtains a close fit against the end of the helve 1, whereby to prevent displacement of the hook when using the ax in its ordinary capacity. It will thus be understood that the hook also acts as a retainer and guard to prevent the ax head from becoming detached from the helve.

When the implement is required for use in the capacity of a cant-hook the bill of the hook is detached from the helve and ax head, thereby permitting the hook to swing freely, so as to be engaged with the pole, log, or tree trunk to be turned. The clip 7 and the toothed portion of the back of the ax head cooperate with the hook to prevent slipping of the part required to be turned.

The shank of the hook adjacent the bill 9 is provided upon opposite sides with projections 13 to snap into depressions formed in the inner faces of the elements comprising the clip 7 to secure the hook in folded position, as shown most clearly in Fig. 3.

Having thus described the invention, I claim:

1. An ax comprising a blade having its back sloping and toothed and having a portion at the outer end of the back separated therefrom and forked to provide a clip, a helve fitted in an opening formed in the ax head, a clamp on the helve, and a cant-hook pivoted to the clamp and adapted to co-operate with the toothed back and the ax head, and having lateral extensions to be gripped between the furcations of the clip and to extend over the ax head and prevent displacement thereof from the helve.

2. An implement comprising an ax head provided adjacent the forward end of its back with a clip, a helve fitted to the ax head, a cant-hook pivoted to the helve and adapted to extend over the forward edge of the ax head and prevent displacement of the latter from the helve, and positive interengaging means between the clip and hook to hold the latter in place.

3. An implement comprising an ax head provided adjacent the forward end of its back with a clip, a helve fitted to the ax head, a clamp on the helve, a cant-hook pivoted to the clamp and adapted to extend over and engage the forward edge of the ax head, and positive interengaging means between the hook and clip.

In testimony whereof I affix my signature.

WILLIAM A. CICERO. [L. S.]